United States Patent
Saeki et al.

(10) Patent No.: US 11,942,086 B2
(45) Date of Patent: Mar. 26, 2024

(54) DESCRIPTION SUPPORT DEVICE AND DESCRIPTION SUPPORT METHOD

(71) Applicant: Panasonic Intellectual Property Management Co., Ltd., Osaka (JP)

(72) Inventors: Natsuki Saeki, Kanagawa (JP); Shoichi Araki, Osaka (JP); Masakatsu Hoshimi, Osaka (JP); Takahiro Kamai, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 492 days.

(21) Appl. No.: 17/125,295

(22) Filed: Dec. 17, 2020

(65) Prior Publication Data

US 2021/0104240 A1    Apr. 8, 2021

Related U.S. Application Data

(63) Continuation of application No. PCT/JP2019/036504, filed on Sep. 18, 2019.

(30) Foreign Application Priority Data

Sep. 27, 2018  (JP) .................................. 2018-182534

(51) Int. Cl.
  *G10L 15/22*    (2006.01)
  *G06Q 30/016*   (2023.01)
  *G10L 15/06*    (2013.01)

(52) U.S. Cl.
  CPC .............. *G10L 15/22* (2013.01); *G10L 15/06* (2013.01); *G06Q 30/016* (2013.01)

(58) Field of Classification Search
  CPC ..... G10L 15/22; G10L 15/06; G10L 15/1822; G10L 15/063; G06Q 30/016; G06Q 10/00; G06Q 50/10; G06F 40/30

(Continued)

(56) References Cited

U.S. PATENT DOCUMENTS 6,766,069 B1 * 7/2004 Dance .................. G06F 40/274
                                                    382/229
9,936,066 B1 * 4/2018 Mammen ............ H04M 3/2218
(Continued)

FOREIGN PATENT DOCUMENTS

JP          2013-25609         2/2013

OTHER PUBLICATIONS

International Search Report dated Nov. 5, 2019 in International (PCT) Application No. PCT/JP2019/036504.

(Continued)

*Primary Examiner* — Thuykhanh Le
(74) *Attorney, Agent, or Firm* — Wenderoth, Lind & Ponack, L.L.P.

(57) ABSTRACT

A description support device for displaying information on a topic to be checked in an utterance by a user, the description support device includes: an inputter to acquire input information indicating an utterance sentence corresponding to the utterance; a controller to generate information indicating a check result of the topic for the utterance sentence; and a display to display information generated by the controller, wherein the display is configured to display a checklist indicating whether or not the topic is described in the utterance sentence indicated by the input information sequentially acquired by the inputter, and wherein the display is configured to display, according to a likelihood of each utterance sentence, display information including the utterance sentence, the likelihood defining the check result of the topic in the checklist.

17 Claims, 14 Drawing Sheets

(58) Field of Classification Search
USPC .......................................................... 704/231
See application file for complete search history.

(56) References Cited

U.S. PATENT DOCUMENTS

| | | | | |
|---|---|---|---|---|
| 10,079,021 | B1* | 9/2018 | Barra Chicote | G10L 13/027 |
| 10,210,267 | B1* | 2/2019 | Lloyd | G06F 16/3344 |
| 10,382,379 | B1* | 8/2019 | Zhang | G06Q 10/107 |
| 11,017,237 | B1* | 5/2021 | Huang | G06N 5/022 |
| 11,093,691 | B1* | 8/2021 | Mossoba | G06F 40/117 |
| 11,340,758 | B1* | 5/2022 | Sood | H04W 4/21 |
| 11,343,468 | B2* | 5/2022 | Kim | H04N 7/148 |
| 11,468,625 | B2* | 10/2022 | Manzari | H04N 23/631 |
| 11,481,769 | B2* | 10/2022 | Van Os | G06Q 20/3223 |
| 11,496,797 | B2* | 11/2022 | Xu | H04N 21/4788 |
| 2004/0174434 | A1* | 9/2004 | Walker | H04N 1/32128 348/211.6 |
| 2005/0268317 | A1* | 12/2005 | Cormack | H04H 60/37 725/25 |
| 2009/0315678 | A1* | 12/2009 | Padmanabhan | H04Q 9/00 340/10.1 |
| 2010/0331041 | A1* | 12/2010 | Liao | G06V 10/462 455/556.1 |
| 2012/0042288 | A1* | 2/2012 | Liao | G06F 3/017 348/207.1 |
| 2012/0232983 | A1* | 9/2012 | Bertha | G06Q 30/02 705/14.1 |
| 2013/0016176 | A1* | 1/2013 | Hines | H04N 7/14 348/E7.083 |
| 2013/0262126 | A1* | 10/2013 | Schalk | G10L 21/06 704/275 |
| 2014/0377733 | A1* | 12/2014 | Olsen, Jr. | G09B 7/07 434/350 |
| 2015/0169525 | A1* | 6/2015 | Palm | G06Q 50/01 715/230 |
| 2015/0170653 | A1* | 6/2015 | Berndt | G10L 15/22 704/275 |
| 2016/0140858 | A1* | 5/2016 | Adderly | G06F 40/30 704/9 |
| 2016/0224574 | A1* | 8/2016 | Horvitz | G06F 16/332 |
| 2017/0052937 | A1* | 2/2017 | Sirven | G06F 3/04845 |
| 2017/0091572 | A1* | 3/2017 | Lindberg | G06V 20/62 |
| 2017/0206891 | A1* | 7/2017 | Lev-Tov | G10L 15/063 |
| 2017/0228018 | A1* | 8/2017 | Schaeferjohann | G06F 3/013 |
| 2017/0249384 | A1* | 8/2017 | Kandylas | G06F 16/358 |
| 2017/0286383 | A1* | 10/2017 | Koul | G06V 10/44 |
| 2017/0324785 | A1* | 11/2017 | Taine | H04L 51/043 |
| 2017/0329817 | A1* | 11/2017 | Dispensa | G06F 16/248 |
| 2017/0352361 | A1* | 12/2017 | Thörn | G11B 27/031 |
| 2018/0005624 | A1* | 1/2018 | Shi | G10L 15/22 |
| 2018/0025726 | A1* | 1/2018 | Gatti de Bayser | G10L 15/22 704/257 |
| 2018/0034879 | A1* | 2/2018 | Chegini | G11B 27/102 |
| 2018/0039253 | A1* | 2/2018 | Jacobs, II | G05B 19/4093 |
| 2018/0096278 | A1* | 4/2018 | Lev-Tov | G10L 15/22 |
| 2018/0096680 | A1* | 4/2018 | Lee | G10L 15/1815 |
| 2018/0122377 | A1* | 5/2018 | Skantze | G10L 15/1822 |
| 2018/0129188 | A1* | 5/2018 | Jacobs, II | G05B 19/4093 |
| 2018/0139204 | A1* | 5/2018 | Votaw | G06T 11/60 |
| 2018/0144738 | A1* | 5/2018 | Yasavur | G06F 16/90332 |
| 2018/0165984 | A1* | 6/2018 | Waldron | G06V 20/20 |
| 2018/0190266 | A1* | 7/2018 | Sun | H04M 3/42221 |
| 2018/0191912 | A1* | 7/2018 | Cartwright | H04L 65/403 |
| 2018/0204571 | A1* | 7/2018 | Nada | G10L 15/22 |
| 2018/0239750 | A1* | 8/2018 | Ye | H04N 21/4884 |
| 2018/0266531 | A1* | 9/2018 | Brown | F16H 3/091 |
| 2018/0276896 | A1* | 9/2018 | Launonen | G06T 19/006 |
| 2018/0284975 | A1* | 10/2018 | Carrier | G06F 16/9535 |
| 2018/0293221 | A1* | 10/2018 | Finkelstein | G06N 20/00 |
| 2018/0336902 | A1* | 11/2018 | Cartwright | G06F 16/61 |
| 2019/0043302 | A1* | 2/2019 | Lyons | G07F 17/3209 |
| 2019/0051301 | A1* | 2/2019 | Locascio | G06V 40/172 |
| 2019/0065615 | A1* | 2/2019 | Room | G06F 16/954 |
| 2019/0108578 | A1* | 4/2019 | Spivack | G09B 5/065 |
| 2019/0155843 | A1* | 5/2019 | Cannings | G10L 15/1815 |
| 2019/0156162 | A1* | 5/2019 | King | G06F 40/00 |
| 2019/0214005 | A1* | 7/2019 | Abdallah | H04L 67/535 |
| 2019/0228765 | A1* | 7/2019 | Luo | G10L 15/1807 |
| 2019/0279620 | A1* | 9/2019 | Talwar | G10L 15/22 |
| 2019/0287415 | A1* | 9/2019 | Zavesky | G09B 7/00 |
| 2019/0294638 | A1* | 9/2019 | Sugiyama | G06F 16/90332 |
| 2019/0326022 | A1* | 10/2019 | El-kalliny | G16H 80/00 |
| 2019/0349320 | A1* | 11/2019 | Karuppusamy | H04L 51/02 |
| 2019/0371302 | A1* | 12/2019 | Watanabe | G06F 40/211 |
| 2019/0371305 | A1* | 12/2019 | Watanabe | G10L 15/1807 |
| 2019/0378024 | A1* | 12/2019 | Singh | G06N 5/043 |
| 2020/0020333 | A1* | 1/2020 | Amores | G10L 15/22 |
| 2020/0043479 | A1* | 2/2020 | Mont-Reynaud | G06F 40/58 |
| 2020/0088463 | A1* | 3/2020 | Jeong | G06F 3/167 |
| 2020/0110931 | A1* | 4/2020 | Saluja | G06F 16/9566 |
| 2020/0151244 | A1* | 5/2020 | Rastogi | G06F 40/194 |
| 2020/0151390 | A1* | 5/2020 | Li | G06F 40/295 |
| 2020/0234045 | A1* | 7/2020 | Palomo | G06F 16/532 |
| 2020/0242964 | A1* | 7/2020 | Wu | G09B 7/02 |
| 2020/0258013 | A1* | 8/2020 | Monnett | H04L 41/5074 |
| 2020/0320365 | A1* | 10/2020 | Arat | G06F 8/35 |
| 2020/0342652 | A1* | 10/2020 | Rowell | G06V 10/82 |
| 2020/0371663 | A1* | 11/2020 | Rubinstein | G06F 3/0482 |
| 2020/0379122 | A1* | 12/2020 | Tontiruttananon | G01S 19/215 |
| 2020/0387276 | A1* | 12/2020 | Scholler | G06F 3/042 |
| 2021/0011899 | A1* | 1/2021 | Olivier | G06F 40/134 |
| 2021/0042724 | A1* | 2/2021 | Rathod | G07G 1/0054 |
| 2021/0056251 | A1* | 2/2021 | Parmar | G06F 3/04847 |
| 2021/0073293 | A1* | 3/2021 | Fenton | H04L 51/08 |
| 2021/0076105 | A1* | 3/2021 | Parmar | G06F 3/0425 |
| 2021/0092081 | A1* | 3/2021 | Mullins | G06T 19/006 |
| 2021/0110895 | A1* | 4/2021 | Shriberg | G06F 40/20 |
| 2021/0118442 | A1* | 4/2021 | Poddar | G06F 40/56 |
| 2021/0120206 | A1* | 4/2021 | Liu | H04L 67/306 |
| 2021/0142356 | A1* | 5/2021 | Samanta | G06F 40/169 |
| 2021/0142706 | A1* | 5/2021 | Mehandjiysky | G09G 3/035 |
| 2021/0152508 | A1* | 5/2021 | Willis | H04L 51/18 |
| 2021/0183362 | A1* | 6/2021 | Koji | G06F 40/30 |
| 2021/0192302 | A1* | 6/2021 | Wang | G06K 19/06037 |
| 2021/0235997 | A1* | 8/2021 | Talgorn | A61B 5/163 |
| 2021/0374326 | A1* | 12/2021 | Mossoba | H04L 51/046 |
| 2022/0092131 | A1* | 3/2022 | Koukoumidis | G06F 16/3323 |
| 2022/0148248 | A1* | 5/2022 | McIntyre-Kirwin | G06V 20/20 |
| 2022/0159319 | A1* | 5/2022 | Wang | H04N 21/2353 |
| 2022/0282910 | A1* | 9/2022 | Jeong | G06N 20/00 |
| 2022/0292122 | A1* | 9/2022 | Liang | G06F 16/335 |
| 2022/0383367 | A1* | 12/2022 | Chandler | G06F 40/117 |
| 2023/0153347 | A1* | 5/2023 | Shunock | G06Q 30/02 705/14.54 |

OTHER PUBLICATIONS

International Preliminary Report on Patentability dated Apr. 8, 2021 in International (PCT) Application No. PCT/JP2019/036504.

* cited by examiner

Fig. 8

HISTORY DATA (CONVERSATION ID: XXXX)

| No. | AUDIO DATA | UTTERANCE SENTENCE | LIKELIHOOD INFORMATION | | | USER EVALUATING INFORMATION | | |
|---|---|---|---|---|---|---|---|---|
| | | | C1 | C2 | ... | C1 | C2 | ... |
| 1 | FILE 1 | You can be an ABC card member | 0.99 | 0.21 | ... | Y | — | ... |
| 2 | FILE 2 | Thank you for your contact | 0.41 | 0.75 | ... | — | N | ... |
| 3 | FILE 3 | | | | | | | |

| PERSON IN CHARGE | DATE AND TIME | CUSTOMER | | |
|---|---|---|---|---|
| Taro Tanaka | 2018/08/03 15:30 | Jiro Matsushita | ☑ | 🕐 |
| Hanako Tanaka | 2018/08/02 10:00 | Saburo Matxushita | ☑ | 🕐 |

61 — PERSON IN CHARGE
62 — DATE AND TIME
63 — CUSTOMER
64 — ☑
65 — 🕐
23

DESCRIPTION SUPPORT DEVICE AND DESCRIPTION SUPPORT METHOD

BACKGROUND

1. Technical Field

The present disclosure relates to a description support device and a description support method.

2. Related Art

JP 2013-25609 A discloses an explanation support system for supporting an explanation given by utilizing a computer terminal. In the explanation support system of JP 2013-25609 A, when a keyword included in a checklist is detected in a voice recognition result of collected sound, control means of the computer terminal displays a message including the detected keyword on a display. At the same time, the control means extracts a voice recognition result at the sound collection time of the keyword and notifies the explanation situation to the backyard terminal.

SUMMARY

An object of the present disclosure is to provide a description support device and a description support method facilitating to support a user in checking description of a topic by information processing.

A description support device according to an aspect of the present disclosure is a device for displaying information on a topic to be checked in a user's utterance. The description support device includes: an inputter to acquire input information indicating an utterance sentence corresponding to the utterance; a controller to generate information indicating a check result of the topic for the utterance sentence; and a display to display information generated by the controller, wherein the display is configured to display a checklist indicating whether or not the topic is described in the utterance sentence indicated by the input information sequentially acquired by the inputter, and wherein the display is configured to display, according to a likelihood of each utterance sentence, display information including the utterance sentence, the likelihood defining the check result of the topic in the checklist.

A description support method according to an aspect of the present disclosure is a method of displaying information on a topic to be checked in a user's utterance. The description support method includes: acquiring, by an inputter, input information indicating an utterance sentence corresponding to the utterance; generating, by a controller, information indicating a check result of the topic for the utterance sentence; and displaying, by a display, information generated by the controller; wherein displaying the information by the display includes: displaying a checklist indicating whether or not the topic is described in the utterance sentence indicated by the input information sequentially acquired by the inputter, and displaying, according to a likelihood of each utterance sentence, display information including the utterance sentence, the likelihood defining the check result of the topic in the checklist.

The description support device and the description support method according to the present disclosure can facilitate to support a user in checking description of the topic by information processing.

BRIEF DESCRIPTION OF THE DRAWINGS

FIG. 8 is a diagram for explaining history data in the description support device;

FIG. 9 is a diagram showing a display example of a conversation list in the description support device;

DESCRIPTION OF EMBODIMENTS

Embodiments will be described in detail below with reference to the drawings as appropriate. However, more detailed description than necessary may be omitted. For example, detailed description of already well-known matters and redundant description of substantially the same configuration may be omitted. This is to avoid the following description from becoming unnecessary redundant and to facilitate understanding by those skilled in the art.

In addition, the applicant(s) provides the accompanying drawings and the following description to enable those skilled in the art to sufficiently understand the present disclosure, which does not intend to limit the claimed subject matter.

First Embodiment

Hereinafter, a first embodiment of the present disclosure will be described with reference to the drawings.

1. Configuration 1-1. System Outline

Figure 1:
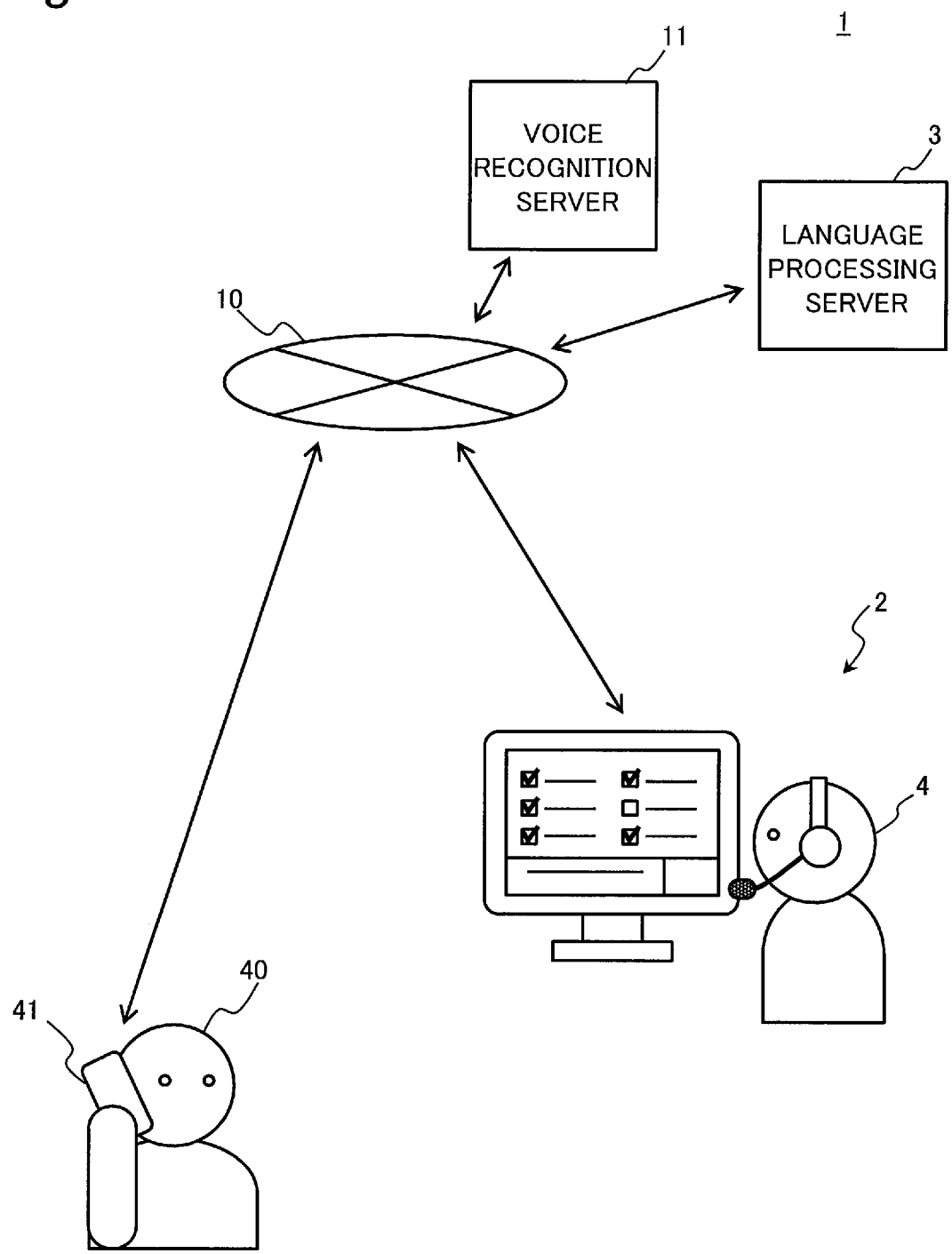
FIG. 1 is a diagram showing an outline of a description support system according to a first embodiment of the present disclosure.

A description support system according to the first embodiment will be described with reference to FIG. 1. FIG. 1 is a diagram showing an outline of a description support system 1 according to the present embodiment.

As shown in FIG. 1, the system 1 includes a description support device 2, a language processing server 3, and a voice recognition server 11. The system 1 automatically detects whether a user 4 such as in a customer service adequately describes, with utterances, important matters (i.e. topics) for a product or contract in a conversation with a customer 40, and visualizes the check results of the conversation.

As shown in FIG. 1, the description support device 2 according to the present embodiment communicates with various customer terminals 41, which the customer 40 for the user 4 has, via a communication network 10 such as a public telephone network, and communicates data with various servers 3 and 11. The system 1 can be applied to information processing for support when the user 4 such as an operator gives various descriptions to the customer 40 in a call center or a remote customer service system, for example.

Hereinafter, configurations of the description support device 2 and the various servers 3 and 11 in the system 1 will be described.

1-2. Configuration of Description Support Device

Figure 2:
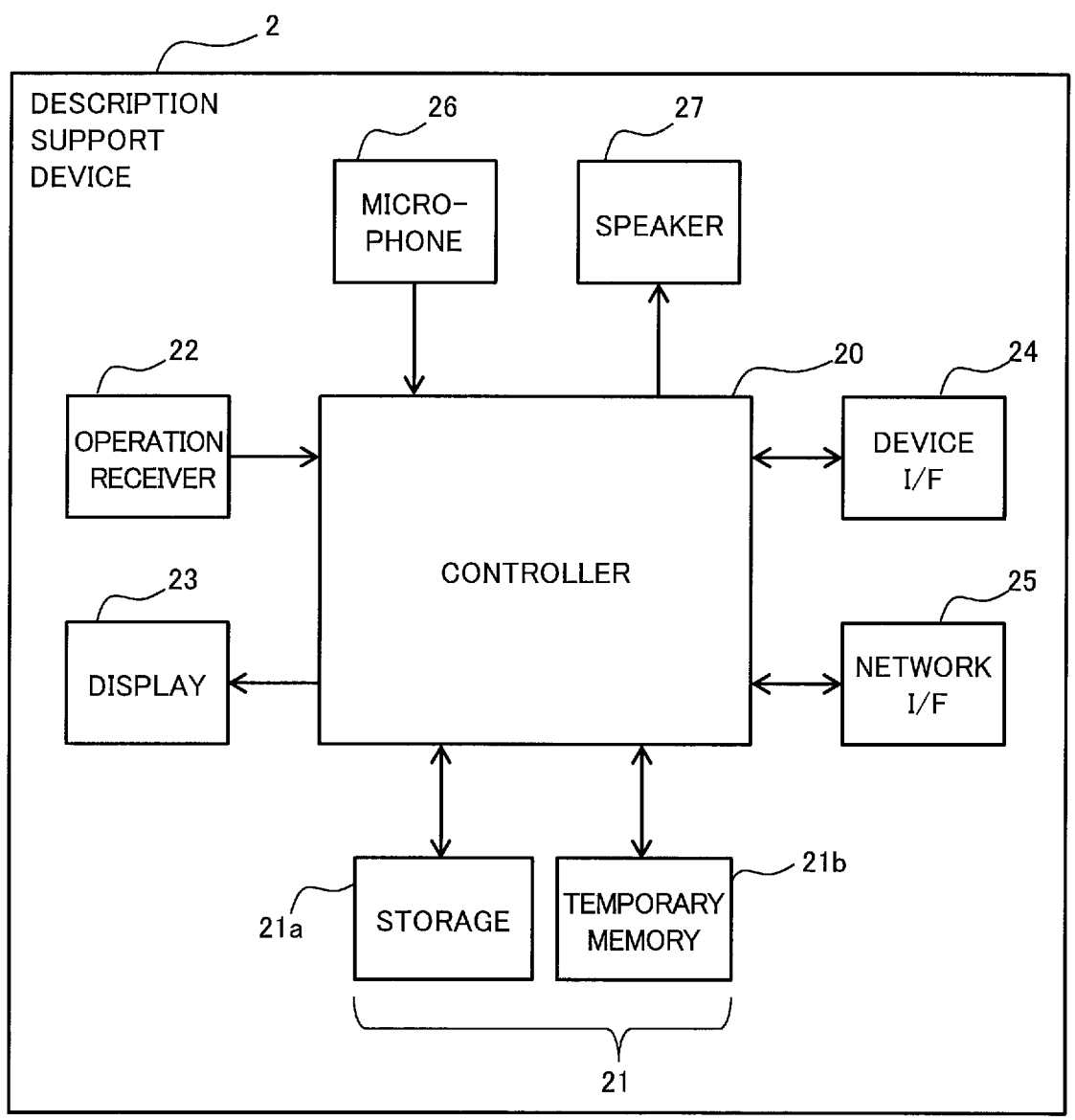
FIG. 2 is a block diagram illustrating a configuration of a description support device in the description support system.

The configuration of the description support device 2 in the system 1 will be described with reference to FIG. 2. FIG. 2 is a block diagram illustrating the configuration of the description support device 2.

For example, the description support device 2 is an information terminal such as a personal computer, a tablet terminal, or a smartphone. The description support device 2 illustrated in FIG. 2 includes a controller 20, a memory 21, an operation receiver 22, a display 23, a device interface 24, and a network interface 25. Hereinafter, the interface is abbreviated as "I/F". Further, the description support device 2 includes a microphone 26 and a speaker 27, for example.

The controller 20 includes, for example, a CPU or MPU that realizes a predetermined function in cooperation with software, and controls the whole operation of the description support device 2. The controller 20 reads data and programs stored in the memory 21 and performs various kinds of arithmetic processing to realize various functions. For example, the controller 20 executes a program including instructions for realizing various kinds of processing of the description support device 2 in the system 1. For example, the above program may be an application program, may be provided from the communication network 10 or the like, or may be stored in a portable recording medium.

The controller 20 may be a hardware circuit such as a dedicated electronic circuit or a reconfigurable electronic circuit designed to realize a predetermined function. The controller 20 may be composed of various semiconductor integrated circuits such as a CPU, MPU, GPU, GPGPU, TPU, microcomputer, DSP, FPGA, and ASIC.

The memory 21 is a recording medium that stores programs and data required to realize the functions of the description support device 2. As shown in FIG. 2, the memory 21 includes a storage 21a and a temporary memory 21b.

The storage 21a stores parameters, data, control programs, and the like for realizing a predetermined function. The storage 21a is composed of an HDD or SSD, for example. For example, the storage 21a stores the above-mentioned programs and data indicating the topics to be checked by the system 1.

The temporary memory 21b is composed of, for example, a RAM such as a DRAM or SRAM, and temporarily stores (i.e., holds) data. For example, the temporary memory 21b may function as a work area of the controller 20, or may be configured by a storage area in the internal memory of the controller 20.

The operation receiver 22 is a user interface device operated by a user. For example, the operation receiver 22 includes a keyboard, a mouse, a touch pad, a touch panel, buttons, switches, and combinations thereof. The operation receiver 22 is an example of an inputter that acquires various kinds of information input by a user operation.

The display 23 is composed of a liquid crystal display or an organic EL display, for example. The display 23 displays information indicating a check result by the system 1, for example. Further, the display 23 may display various kinds of information such as various icons for operating the operation receiver 22 and information input from the operation receiver 22.

The device I/F 24 is a circuit for connecting an external device to the description support device 2. The device I/F 24 is an example of a communication interface that performs communication according to a predetermined communication standard. The predetermined standard includes USB, HDMI (registered trademark), IEEE1395, WiFi, Bluetooth (registered trademark), and the like. The device I/F 24 may be an inputter that receives various kinds of information with respect to an external device in the description support device 2.

The network I/F 25 is a circuit for connecting the description support device 2 to the communication network 10 via a wireless or wired communication line. The network I/F 25 is an example of a communication interface that performs communication conforming to a predetermined communication standard. The predetermined communication standard includes communication standards such as IEEE802.3, IEEE802.11a/11b/11g/11ac, and 3G or 4G for mobile communication. The network I/F 25 may be an inputter that receives various kinds of information in the description support device 2 via the communication network 10.

The microphone 26 is an input device that collects sound and acquires audio data of the sound collection result. The microphone 26 is an example of an inputter in the present embodiment. The microphone 26 and the speaker 27 constitute a headset used by the user 4 as illustrated in FIG. 1, for example.

The speaker 27 is an output device that outputs audio data as sound, and is an example of the outputter in the present embodiment. The microphone 26 and the speaker 27 may be provided externally to the information terminal that is the description support device 2 or may be built in the information terminal.

The configuration of the description support device 2 as described above is an example, and the configuration of the description support device 2 is not limited to this. The description support device 2 may be configured by various computers other than the information terminal. The inputter in the description support device 2 may be realized by cooperation with various kinds of software in the controller 20 and the like. The inputter in the description support device 2 may acquire various kinds of information by reading various kinds of information stored in various recording media (e.g., the storage 21a) into the work area (e.g., temporary memory 21b) of the controller 20.

1-3. Server Configuration

Figure 3:
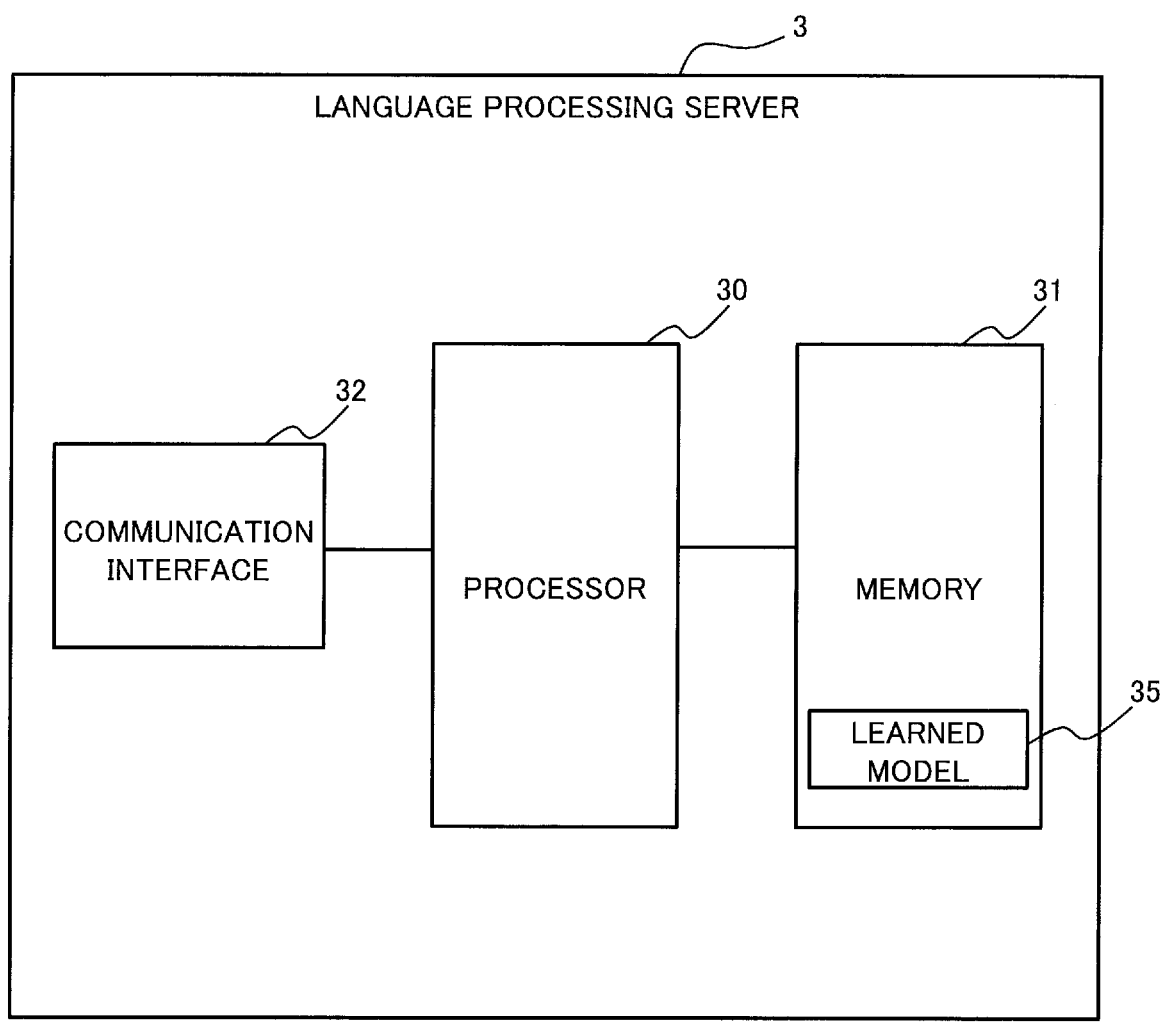
FIG. 3 is a block diagram illustrating a configuration of a language processing server in the description support system.

As an example of hardware configurations of the various servers 3 and 11 in the system 1, a configuration of a language processing server 3 will be described with reference to FIG. 3. FIG. 3 is a block diagram illustrating the configuration of the language processing server 3 in the system 1.

The language processing server 3 illustrated in FIG. 3 includes an processor 30, a memory 31, and a communication interface 32. The language processing server 3 is one or more computers.

The processor 30 includes, for example, a CPU and a GPU that realize a predetermined function in cooperation with software, and controls the operation of the language processing server 3. The processor 30 reads data and programs stored in the memory 31 and performs various kinds of arithmetic processing to realize various functions.

For example, the processor 30 executes a program of a learned model 35 as a program for executing natural language processing for checking the topics described later. The learned model 35 may be various neural networks such as a feedforward neural language model, and has an input layer, one or more intermediate layers, and an output layer. For example, the output layer of the learned model 35 includes a plurality of nodes corresponding to a plurality of topics to output the likelihood for each of the topics.

Furthermore, the processor 30 may execute word embedding for generating an input vector to be input to the learned model 35 by using e.g. word2vec. The learned model 35 may also include the word embedding model. The processor 30 may execute a program for performing machine learning of the learned model 35 or the like. The above various programs may be provided from the communication network 10 or the like, or may be stored in a portable recording medium.

The processor 30 may be a hardware circuit such as a dedicated electronic circuit or a reconfigurable electronic circuit designed to realize a predetermined function. The processor 30 may be composed of various semiconductor integrated circuits such as a CPU, GPU, TPU, MPU, microcomputer, DSP, FPGA, and ASIC.

The memory 31 is a recording medium that stores programs and data required to realize the functions of the language processing server 3, and includes e.g. an HDD or SSD. The memory 31 may include e.g. a DRAM or SRAM, and may function as a work area of the processor 30. For example, the memory 31 stores various dictionaries for terms and phrases in natural language processing by the learned model 35, and various parameter groups and programs that define the learned model 35. The parameter group includes various weighting parameters of the neural network, for example. The memory 31 may store training data and a program for performing machine learning of the learned model 35.

The communication interface 32 is an I/F circuit for performing communication according to a predetermined communication standard, and connects the language processing server 3 to the communication network 10, an external device or the like by data communication. The predetermined communication standard includes IEEE802.3, IEEE802.11a/11b/11g/11ac, USB, HDMI, IEEE1395, WiFi, Bluetooth, and the like.

The voice recognition server 11 has, for example, a voice recognition model that realizes a voice recognition function instead of the learned model 35 in the same configuration as the language processing server 3 described above. The voice recognition model can be configured by various methods, and may be various machine-learned neural networks, for example.

The various servers 3 and 11 in the system 1 are not limited to the above configurations and may have various configurations. The system 1 may be realized in cloud computing. Further, the hardware resources that realize the functions of the various servers 3 and 11 may be shared. Further, one or both of the functions of the various servers 3 and 11 may be installed in the description support device 2.

2. Operation

The operations of the description support system and the description support device 2 configured as described above will be described below.

2-1. Outline of Operation

The outline of the operations of the description support system 1 and the description support device 2 according to the present embodiment will be described with reference to FIGS. 1 to 5.

As shown in FIG. 1, the system 1 performs a detection operation of checking the content of the utterances by the user 4 when the description support device 2 performs voice data communication for conversation between the user 4 and the customer 40, for example. The description support device 2 displays information for visualizing the detection result of the system 1 for the user 4. A display example of the description support device 2 is illustrated in FIG. 4.

Figure 4:
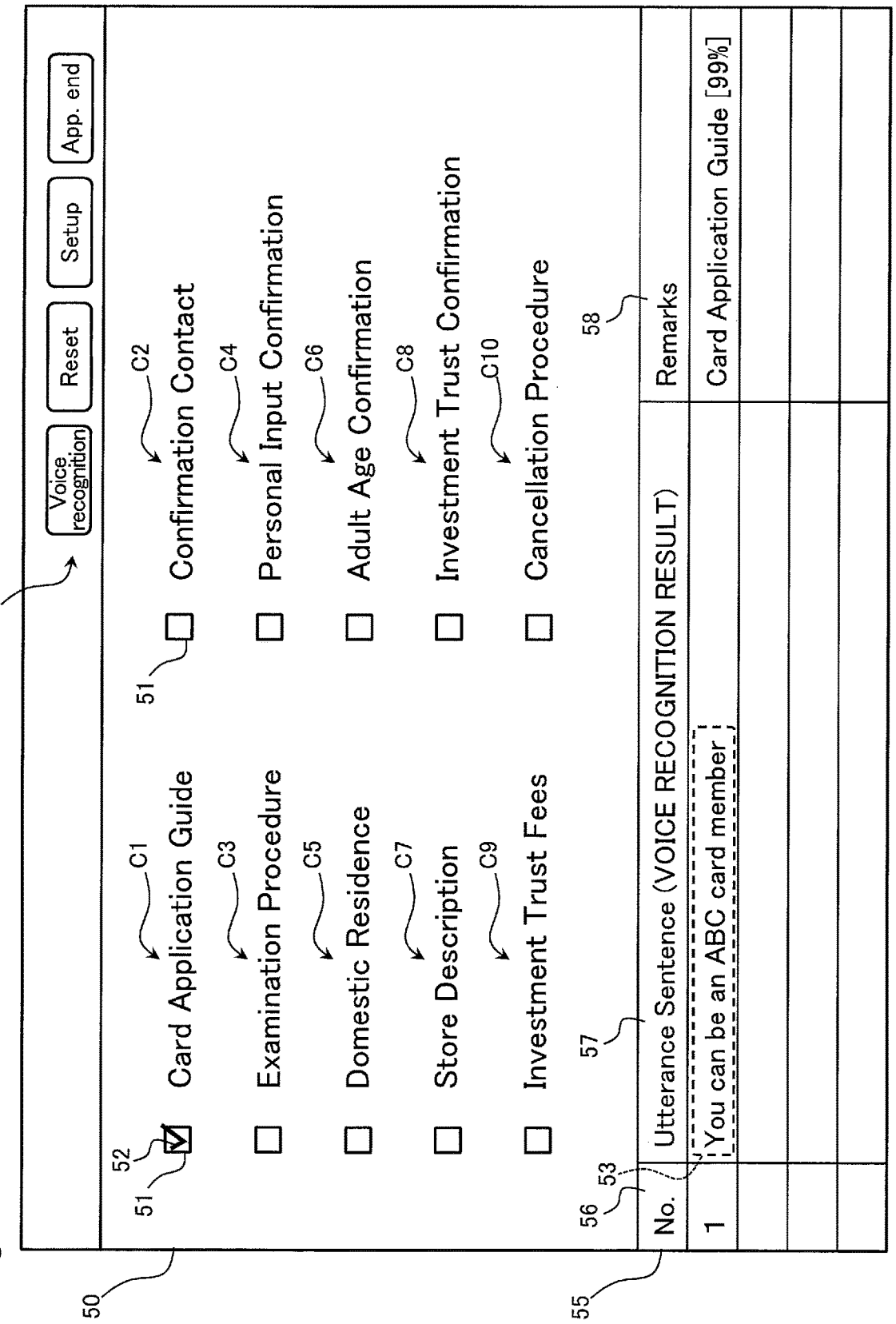
FIG. 4 is a diagram showing a display example in the description support device of the first embodiment.

The display example of FIG. 4 shows an example of a real-time display during the detection operation for the conversation of the user 4. In the display example, the display 23 of the description support device 2 displays various operation buttons 5, a checklist 50, and an utterance list 55. The operation buttons 5 include, for example, a voice recognition button, a reset button, a setup button, and an application end button to input an operation by clicking or the like on the operation receiver 22.

The checklist 50 includes a plurality of topics C1 to C10 and check boxes 51 associated with the respective topics C1 to C10. The topics C1 to C10 are items to be checked in the utterance of the user 4, and are set in advance. The number of the topics C1 to C10 is not particularly limited and can be set as appropriate. Hereinafter, the topics C1 to C10 may be generally referred to as "topic(s) C". The check boxes 51 each have an on state having a check symbol 52 and an off state not having the check symbol 52. The checklist 50 indicates whether or not the topics C corresponding to the check boxes 51 have been described by turning on/off the check boxes 51.

The utterance list 55 displays information on utterance sentences sequentially from the latest voice recognition result to a predetermined number of past minutes, for example. The utterance list 55 includes a number column 56, an utterance sentence column 57, and a remarks column 58. The number column 56 represents the order of utterances output of the voice recognition in the system 1. The utterance sentence column 57 represents the utterance sentence in the voice recognition result. The remarks column 58 indicates notes and the like associated with the utterance sentence. The utterance list 55 is an example of display information in the present embodiment.

FIG. 4 shows a display example when the user 4 utters "You can be an ABC card member". At this time, by executing voice recognition on the utterance sentence 53 having the above contents, for example, the system 1 detects that the utterance sentence 53 describes the topic C1 of the "card application guide". The description support device 2 changes the check box 51 of the topic C1 from the off state to the on state and displays the check box 51 on the display 23 as shown in FIG. 4.

Figure 5:
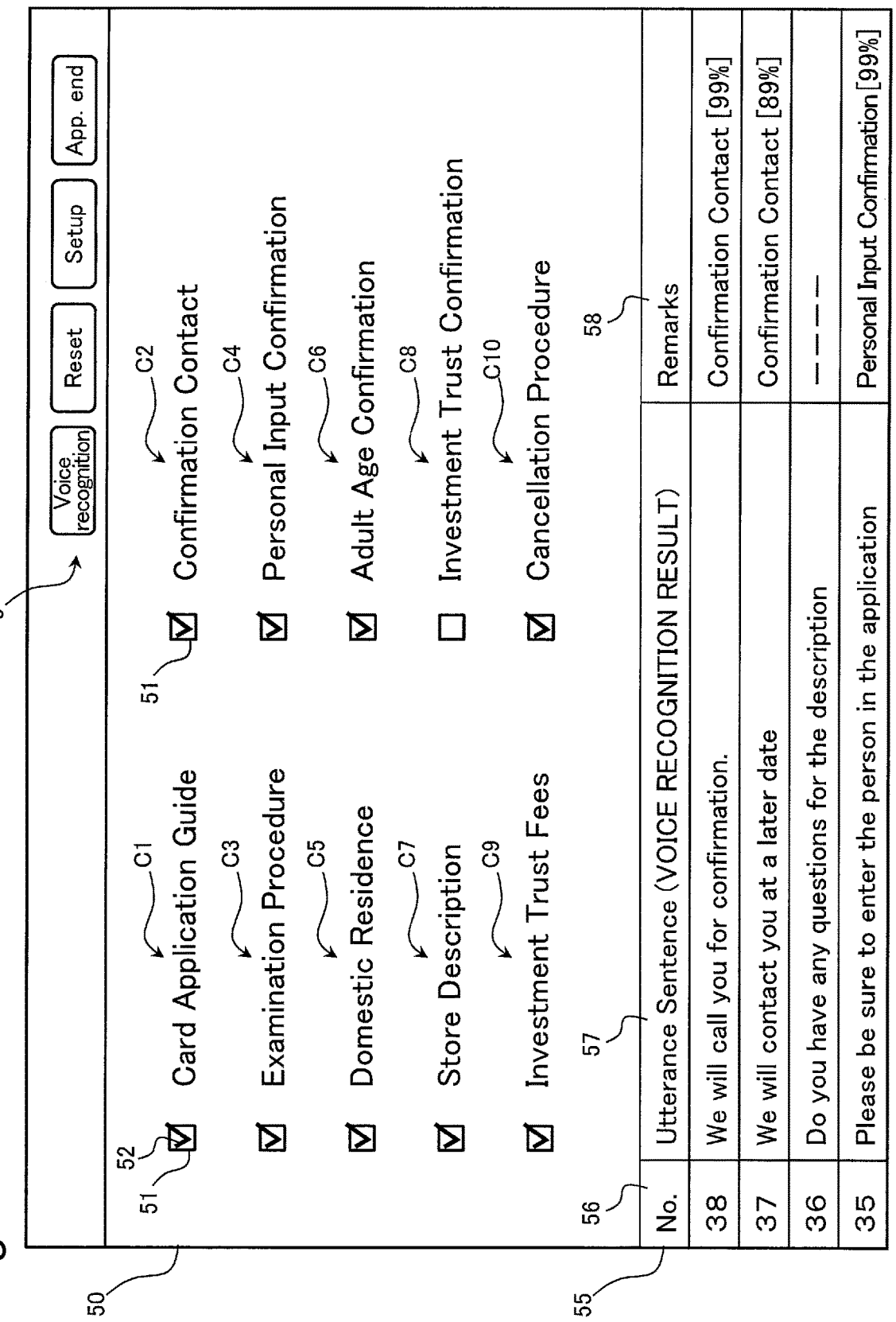
FIG. 5 is a diagram showing a display example in the description support device after FIG. 4.

The system 1 repeats the above detection operation for each utterance of the user 4 to update the display of the display 23 in real time, for example. FIG. 5 shows a display example of the display 23 after the user 4 repeats the utterance. According to the system 1, the user 4 can see the topics C1 to C7, C9, and C10 that have been described by his/her utterance and the topic C8 that is not described in the conversation with the customer 40, for example. Thus, the system 1 can support sales activities by the user 4 or the like.

When executing the detection operation as described above, the system 1 calculates the likelihood for each topic C by applying the natural language processing by the learned model 35 to the utterance sentence, for example. The likelihood indicates the degree to which the corresponding utterance sentence is detected as having described the topic C, and has a value within the range of 0 to 1, for example. Visualizing such information on the process of detection for the user 4 is can be useful in operating the system 1 to realize the support of the user 4 more appropriately.

Therefore, in the present embodiment, the description support device 2 displays the information corresponding to the likelihood together with the corresponding utterance sentence in the utterance list 55, for example. For example, "card application guide [99%]" in the remarks column 58 of FIG. 4 indicates that the likelihood of the topic C1 "card application guide" for the corresponding utterance sentence 53 is "0.99". Thereby, the user 4 can see the degree to which each utterance is detected as having described the topics C1 to C10 in the process of obtaining the check result of the checklist 50 in the system 1.

Further, the description support device 2 of the present embodiment displays the history, which enables the user 4 to verify the detection result of the system 1 as described above even after the real-time detection operation. The verifying result by the user 4 can be utilized for improving the detecting accuracy of the system 1, for example. Hereinafter, details of the operations of the system 1 and the description support device 2 will be described.

2-2. Detection Operation of Description Support System

Figure 6:
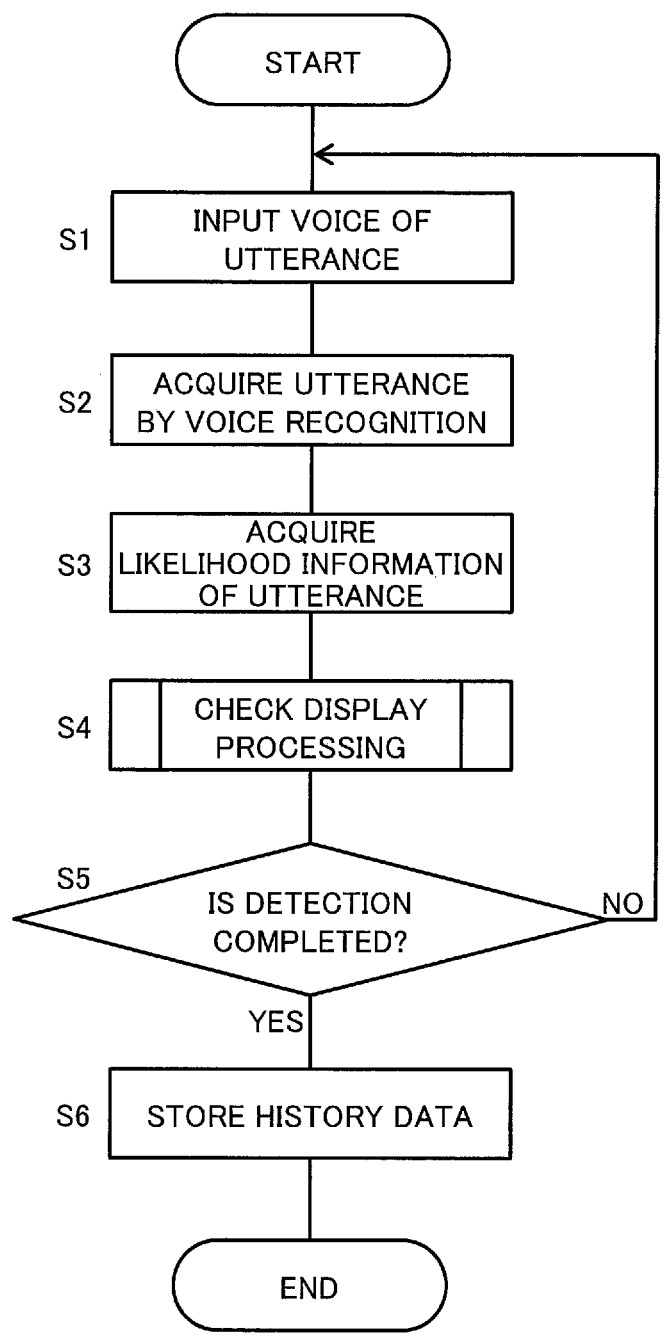
FIG. 6 is a flowchart for explaining a detection operation of the description support system according to the first embodiment.

The detection operation of the description support system 1 according to the present embodiment will be described with reference to FIG. 6. FIG. 6 is a flowchart for explaining the detection operation of the system 1.

Each processing shown in the flowchart of FIG. 6 is executed by the controller 20 of the description support device 2 in the system 1. The flowchart is started, for example, when an operation for starting voice recognition is performed via the operation receiver 22 such as the operation button 5 displayed on the display 23 (see FIG. 4). Further, at the start of the flowchart, all the check boxes 51 in the checklist 50 are set to the off state, for example.

At first, the controller 20 of the description support device 2 acquires audio data indicating voice uttered by the user 4 in the microphone 26 (S1). The microphone 26 collects voice sound to generate audio data in the conversation of the user 4, for example. The audio data of the sound collection result is an example of input information in the present embodiment.

Next, the controller 20 acquires the utterance sentence indicating the voice recognition result of the utterance by communicating data with the voice recognition server 11 (S2). At this time, the controller 20 transmits the input audio data to the voice recognition server 11 via the network I/F 25.

According to the audio data from the description support device 2, the voice recognition server 11 executes processing based on the voice recognition model, generates text data of an utterance sentence, and transmits the text data to the description support device 2. The processing based on the voice recognition model includes utterance division for the audio data and various kinds of voice recognition processing. When receiving the utterance sentence from the voice recognition server 11 via the network I/F 25 (S2), the controller 20 of the description support device 2 records the received utterance sentence and the corresponding audio data in the memory 21.

Next, the controller 20 acquires likelihood information including the likelihood of each topic C for the acquired utterance sentence by communicating data with the language processing server 3 (S3). At this time, the controller 20 transmits the acquired utterance sentence to the language processing server 3 via the network I/F 25.

When receiving the utterance sentence from the description support device 2, the language processing server 3 executes natural language processing by the learned model 35, generates likelihood information, and transmits likelihood information to the description support device 2. In the natural language processing, the received utterance sentence is converted into an input vector by word embedding and input to the learned model 35, for example. The learned model 35 is obtained by machine learning so that the likelihood of each topic C, output in response to the input vector, represents a predicted degree to which each topic C is detected to be described by the corresponding utterance sentence.

Next, the controller 20 of the description support device 2 executes check display processing based on the acquired utterance sentence and likelihood information (S4). The check display process is processing of checking whether or not each of the topics C1 to C10 has been described for each utterance sentence of the voice recognition result of the utterance based on the likelihood information, and displaying the check result as shown in FIG. 4, for example. Details of the check display processing will be described later.

The controller 20 determines whether or not the detection operation of the system 1 is completed based on the operation of the operation button 5, for example (S5). When determining that the detection operation is not completed (NO in S5), the controller 20 returns to step S1 and executes processing subsequent to step S1 on new utterance. The user 4 performs an operation of completing the detection operation when the conversation with the customer 40 is completed, for example.

When determining that the detection operation is completed (YES in S5), the controller 20 generates history data indicating the history of the detection operation and stores it in the memory 21 (S6). The history data will be described later (see FIG. 8).

After storing the history data in the memory 21 (S6), the controller 20 ends the processing according to the flowchart.

According to the above processing, each time the user 4 utters (S1), the likelihood of the utterance sentence of the voice recognition result is calculated (S2 and S3), and the check results for the various topics C1 to C10 are displayed in real time (S4).

When the length of the utterance sentence acquired in step S2 above is shorter than a predetermined value, the controller 20 may omit the processing of step S3. The predetermined value can be set to the number of characters, words, or the like that is expected not to include the description of the various topics C1 to C10 in the utterance sentence. As a result, it is possible to reduce the processing load to utterance unrelated to the description of the topics C1 to C10, such as nods in the conversation.

2-2-1. Check Display Processing

Details of the check display processing (S4 in FIG. 6) will be described with reference to FIG. 7.

Figure 7:
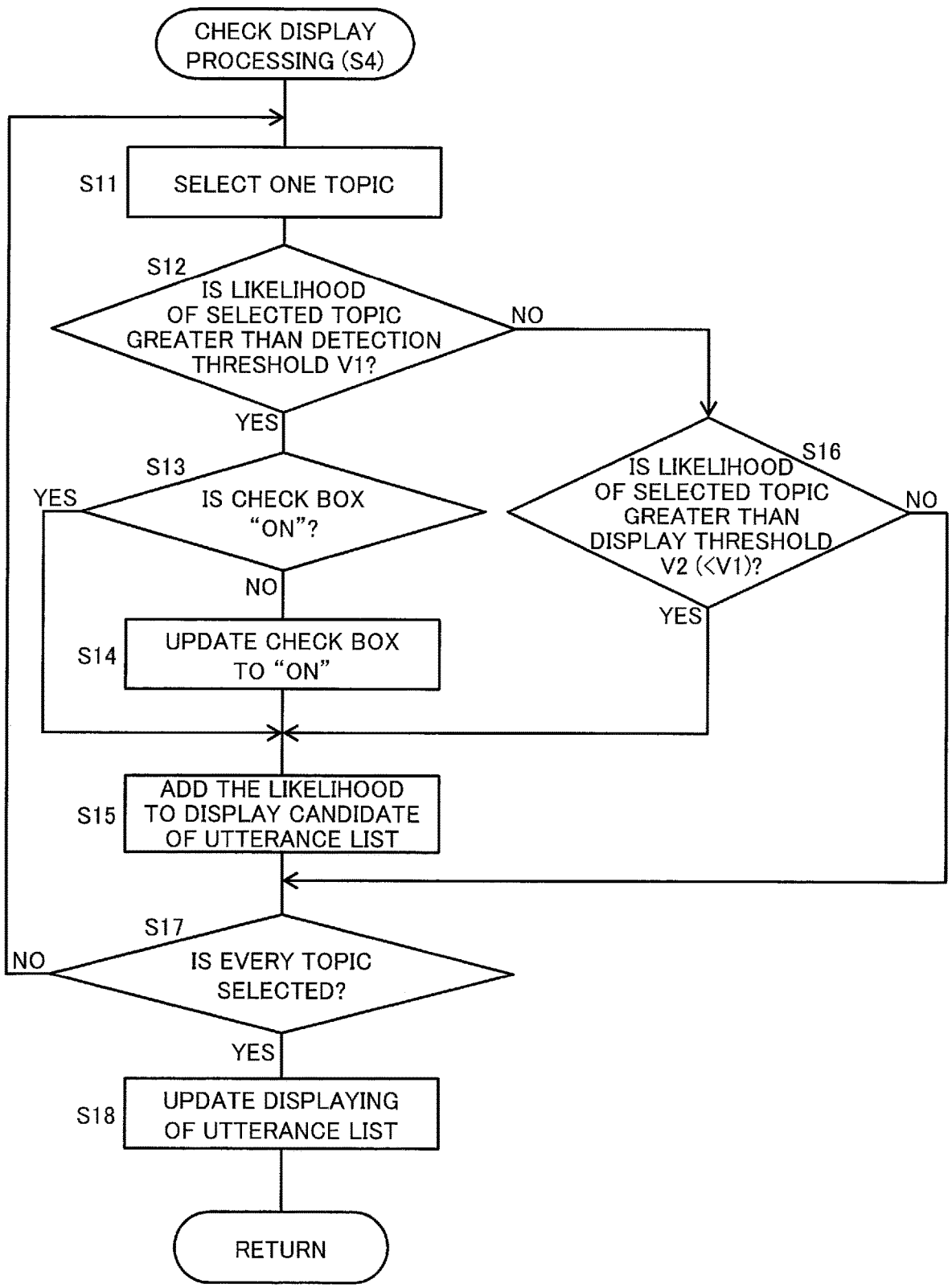
FIG. 7 is a flowchart for explaining check display processing by the description support device.

FIG. 7 shows a flowchart for explaining the check display processing by the description support device 2. The flowchart of FIG. 7 starts in a state in which one utterance sentence is acquired in step S2 of FIG. 6 and likelihood information for the utterance sentence is acquired in step S3.

At first, the controller 20 of the description support device 2 selects, as a check target, one topic C from the plurality of preset topics C1 to C10 (S11). In the flowchart of FIG. 6, the topics C are selected one by one in step S11, in order to check all the topics C1 to C10 for one utterance sentence.

Next, the controller 20 determines whether or not the likelihood in the acquired likelihood information is greater than a detection threshold V1 for the selected topic C (S12). The detection threshold V1 is a threshold value indicating a criterion for detecting that the corresponding topic, C has been described, and is set in view of the likelihood of the utterance sentence having described the topic C, for example.

When determining that the likelihood of the selected topic C is greater than the detection threshold V1 (YES in S12), the controller 20 determines whether or not the check box 51 associated with the topic C in the checklist is in the on state (S13). For example, when the corresponding check box 51 is in the off state with the user 4 not yet described the selected item in the conversation, the controller 20 proceeds to NO in step S13.

When determining that the check box 51 of the selected topic C is not in the on state (NO in S13), the controller 20 changes the check box 51 from the off state to the on state, and updates the display of the checklist 50 in the display 23 (S14). The update of the display in step S14 may be performed simultaneously with step S18.

Further, the controller 20 holds the likelihood of the selected topic C as a candidate to be displayed in the remarks column 58 of the utterance list 55 (S15). Specifically, the controller 20 associates the selected topic C with the likelihood to hold the likelihood in the memory 21 as a display candidate.

On the other hand, when the check box 51 of the selected topic C is in the on state (YES in S13), the controller 20 does not perform the processing of step S14 and proceeds to step S15.

When determining that the likelihood of the selected topic C is not greater than the detection threshold V1 (NO in S12), the controller 20 determines whether or not the likelihood is greater than a display threshold V2, for example (S16). For example, the display threshold V2 is set to a value smaller than the detection threshold V1 by a predetermined width indicating the vicinity of the detection threshold V1. The display threshold V2 is a threshold value indicating a criterion for displaying the likelihood of the utterance sentence in consideration that the likelihood does not reach the detection threshold V1 but may be related to the topic C.

When determining that the likelihood of the selected topic C is greater than the display threshold V2 (YES in S16), the controller 20 holds the likelihood as a display candidate (S15). On the other hand, when determining that the likelihood is not greater than the display threshold V2 (NO in S16), the controller 20 proceeds to step S17 without performing the processing of step S15.

The controller 20 determines whether or not all the topics C1 to C10 are selected as check targets (S17). When all the topics C1 to C10 are not selected (NO in S17), the controller 20 performs the processing subsequent to step S11 on the unselected topic C.

After selecting and checking all the topics C1 to C10 (YES in S17), the controller 20 controls the display to update and display the utterance list 55 (S18). Specifically, the controller 20 additionally displays the utterance sentence in the utterance sentence column 57 of the utterance list 55 (see FIG. 4). When the display candidate for the remarks column 58 is held (S15), the controller 20 additionally displays the held information in the remarks column 58.

When controlling the display 23 to update the utterance list 55 and the like (S18), the controller 20 ends the processing of step S4 of FIG. 6, and proceeds to step S5.

According to the above processing, it is possible to perform a check on each topic C based on the likelihood information for the utterance sentence of the voice recognition result of one utterance of the user 4. At this time, the description support device 2 changes the way of displaying the utterance list 55 according to the likelihood. The user 4 can see the check result of his/her utterance in real time by the checklist 50 and the utterance list 55.

For example, when an utterance sentence has a likelihood greater than the detection threshold V1, the likelihood is displayed in the remarks column 58 of the utterance list 55 together with the check box 51 which is in the on state in the checklist 50. Thereby, the user 4 can see how utterance is required to be detected that the topic C has been described, whether the utterance in the conversation after the check provides sufficient description, or the like.

Even when the likelihood for an utterance sentence, which is greater than the display threshold V2, does not reach the detection threshold V1, the likelihood is displayed in the remarks column 58. With the remarks column 58 when the check box 51 is in the off state, the user 4 can recognize that his/her utterance is insufficient for the description of the topic C.

When an utterance sentence has a likelihood lower than the display threshold V2, the likelihood is not displayed in the remarks column 58 of the utterance list 55. This makes it possible to omit the displaying, in the remarks column 58, of utterances unrelated to any of the topics C1 to 010, such as idle talks.

According to the above processing, when the likelihoods of the plurality of topics C for one utterance sentence are greater than the detection thresholds V1 (YES in S12), a plurality of check boxes 51 can be updated to the on state for the one utterance sentence (S14). When the likelihoods of the plurality of topics C for one utterance sentence are greater than the display threshold V2 (YES in S16) a plurality of likelihoods are displayed together in the remarks column 58, for example (S16 and S18).

2-3. History Data

The description support device 2 according to the present embodiment accumulates history data in the memory each time the above-described detection operation is performed (S6 in FIG. 6). The history data will be described with reference to FIG. 8.

FIG. 8 is a diagram for explaining the history data D1 in the description support device 2. The history data D1 is managed for each "conversation ID", for example. The "conversation ID" is an ID that identifies a conversation in which the detection operation of the system 1 is performed. For example, as shown in FIG. 8, the history data D1 records "utterance numbers", "audio data", "utterance sentences", "likelihood information", and "user evaluating information" in association with each other.

Further, the history data D1 and the detection threshold V1 used for the detection operation may be managed in association with each other in the memory 21. The detection threshold V1 may be managed separately for each of the topics C1 to C10.

In the history data D1, the "utterance number" indicates the order of utterances that are targets for voice recognition in the conversation identified by the conversation ID. The "audio data" is audio data of the utterance that is the target of voice recognition, and is divided into different files for each utterance. The "utterance sentence" indicates text data of the voice recognition result of the utterance corresponding to the audio data of the file of each utterance number. The "likelihood information" includes the likelihood of each topic C for the utterance sentence. The "user evaluating information" indicates the evaluation by the user 4 to the detection result of the system 1, as described later.

In the flowchart of FIG. 6, each time steps S1 to S5 are repeated, the controller 20 of the description support device 2 associates the utterance sentence, the audio data, and the likelihood information with the utterance number assigned sequentially, and records the associated information in the history data D1 (S6). At the time of step S6, the user evaluating information is not particularly recorded and has a null value "–".

2-4. History Verifying Display

The description support device 2 of the present embodiment can display various information for allowing the user 4 to verify the detection result based on the history data D1 as described above. The history verifying display in the description support device 2 will be described with reference to FIGS. 9 to 12.

FIG. 9 shows a display example of a conversation list 6 on the display 23 of the description support device 2. The conversation list 6 is displayed in response to an operation of checking the setup with the operation button 5, for example.

The conversation list 6 manages the history information of the detection operation executed by the system for each conversation ID of the history data D1, for example. In the example of FIG. 9, the conversation list 6 includes a person-in-charge column 61, a date-and-time column 62, a customer column 63, a check history icon 64, and an utterance history icon 65.

In the conversation list 6, the person-in-charge column 61 represents the user 4 in the conversation at the detection operation by the system 1. The date-and-time column 62 represents the date and time when the conversation was held. The customer column 63 represents the customer 40 in the conversation at the detection operation. The check history icon 64 receives an operation of displaying the check history screen. The check history screen displays the final checklist 50 at the detection operation by the system 1. The speech history icon 65 receives an operation of displaying the utterance history screen.

Figure 10:
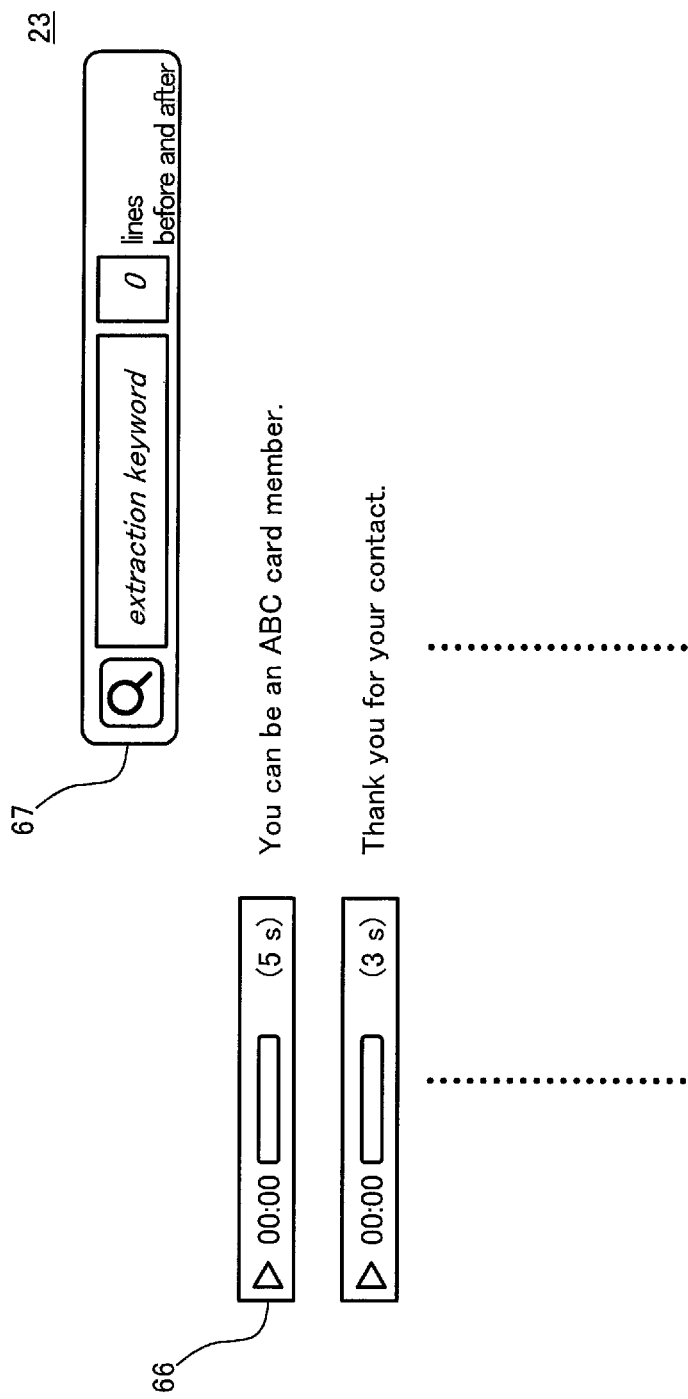
FIG. 10 is a diagram showing a display example of an utterance history screen in the description support device.

FIG. 10 shows a display example of the utterance history screen on the display 23. The utterance history screen displays each utterance sentence as the utterance history in the history data D1 of the conversation associated with the operated utterance history icon 65, and a play bar 66 for playing the audio data in association with each other. Further, in the display example of FIG. 10, a search bar 67 is displayed on the utterance history screen. The description support device 2 performs a keyword search for an utterance sentence according to the operation of the search bar 67, for example. The search range of the search bar 67 may be designated for each line of the utterance sentence.

Figure 11:
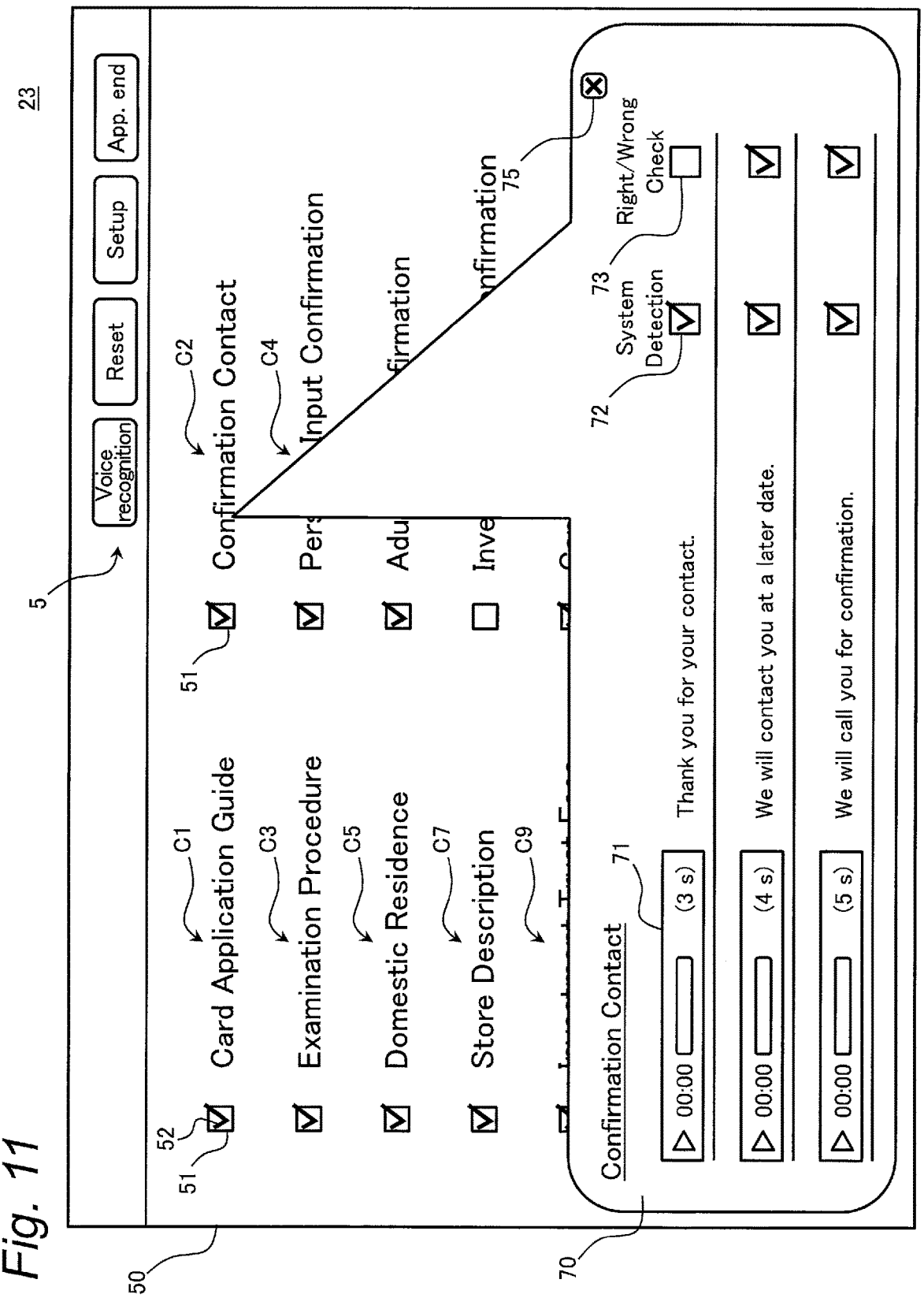
FIG. 11 is a diagram showing a display example of a check history screen in the description support device.

FIG. 11 shows a display example of the check history screen on the display 23. For example, in response to an operation such as double-clicking on the text portion of any of the topics C1 to C10 in the checklist 50 of the check history screen, the description support device 2 of the present embodiment displays the detection history list 70 of the operated topic C in a popup. FIG. 11 illustrates a state in which the detection history list 70 of the topic C2 called "confirmation contact" is displayed.

The detection history list 70 is a list including utterance sentences that are detected as having described or may have described the specific topic C at the conversation. According to the detection history list 70, it is possible to verify not only the utterance sentence of the utterance by which the check box 51 is turned to the on state at the detection operation of the system 1 but also the utterance sentence detected as having described the topic C in the subsequent utterance. The detection history list 70 is an example of display information in the present embodiment.

In the display example of FIG. 11, the detection history list 70 displays playback bars 71, utterance sentences, system detecting boxes 72, and user evaluating boxes 73 in association with each other. The system detecting boxes 72 each have an on/off state indicating whether or not it is detected that the corresponding utterance sentence has described the topic at the detection operation of the system 1.

The user evaluating boxes 73 each have an on/off state indicating whether the detection result represented by the system detecting box 72 is right or wrong, for example. The on/off states of the user evaluating boxes 73 can be changed by an operation of the user 4 such as clicking.

The description support device 2 of the present embodiment stores the information on the user evaluating boxes 73 into the user evaluating information of the history data D1. The user evaluating information in the history data D1 can be used to improve the detecting accuracy of the system 1. For example, the user evaluating information can be used to adjust the detection threshold V1 in the system 1, or can be used as training data for machine learning such as active learning of the learned model 35.

Figure 12:
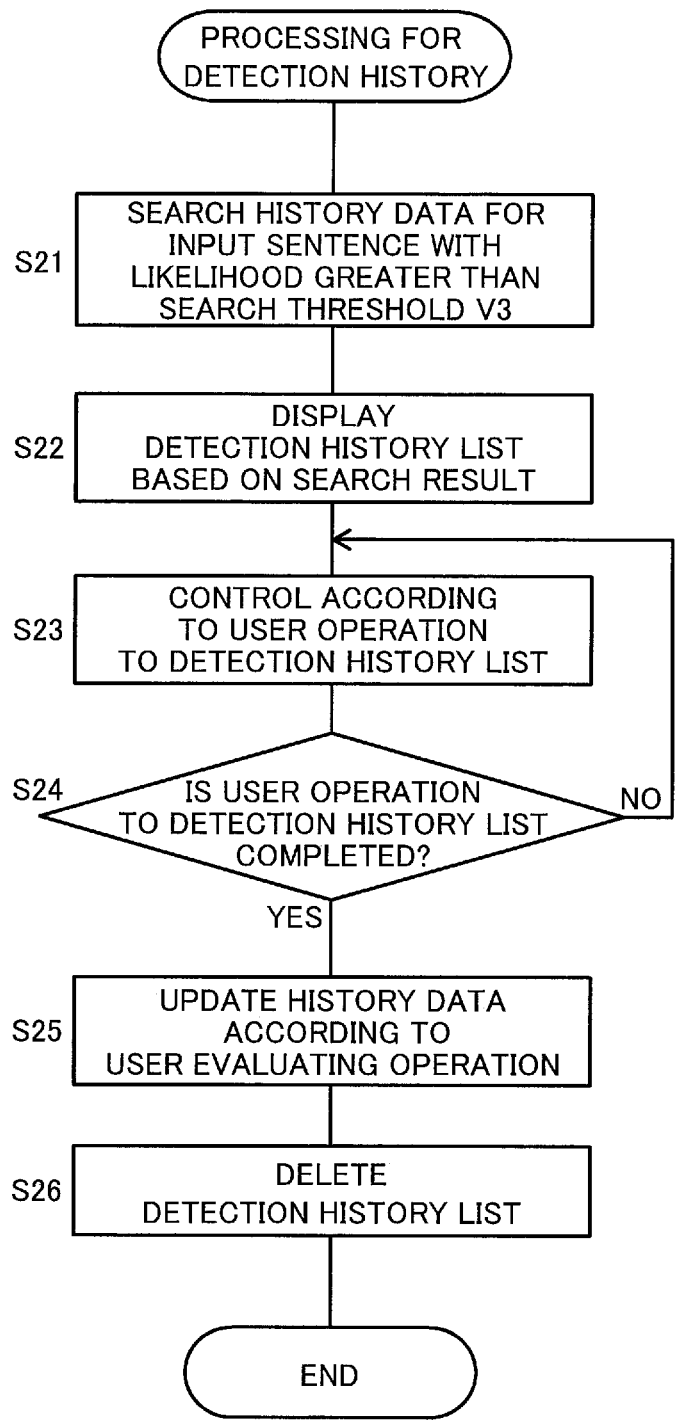
FIG. 12 is a flowchart for explaining processing for a detection history by the description support device.

The processing of the description support device 2 for the detection history list 70 as described above will be described with reference to FIG. 12. FIG. 12 is a flowchart for explaining processing for the detection history by the description support device 2.

Each processing shown in the flowchart of FIG. 12 is executed by the controller 20 of the description support device 2. The flowchart of FIG. 12 is started when an operation of designating the topic C in the checklist 50 is input via the operation receiver 22 on the above-described check history screen.

At first, the controller 20 searches for the utterance sentence associated with the likelihood that is greater than a search threshold V3 in the history data D1 for the topic C designated by the operation of the user 4 (S21). The search threshold V3 is a threshold value that serves as a reference for performing a search for a specific topic, and is set to V3=V1, for example. The search threshold V3 is not limited to this, and may be appropriately set within a range from V2 or more to V1 or less, for example.

Next, the controller 20 generates the detection history list 70 so as to include the searched utterance sentence based on the search result of the history data D1, and displays the detection history list 70 on the display 23 in pop-up, for example (S22). At this time, the system detecting boxes 72 in the detection history list 70 are set to on or off depending on whether or not the likelihood is greater than the detection threshold V1. The user evaluating boxes 73 are all set to off or on in the initial state, for example.

Next, the controller 20 receives an operation in the detection history list 70 to execute control according to various operations (S23). For example, when the user evaluating box 73 is operated, the controller 20 controls the display 23 to display the operated user evaluating box 73 so as to switch the on state or the off state. Further, when the playback bar 71 is operated, the controller 20 controls the speaker 27 to play the audio data corresponding to the operated playback bar 71.

The controller 20 determines whether or not the operation of the detection history list 70 is completed according to the operation of the close button 75 on the popup of the detection history list 70, for example (S24). The controller 20 executes step S23 until the operation of the detection history list 70 is completed (NO in S24).

When the operation of the detection history list 70 is completed (YES in S24), the controller 20 updates the history data D1 according to the states of the user evaluating boxes 73 at the completion of the operation, for example (S25). In the history data D1 stored in the memory 21, the controller 20 records "Y" or "N" in the user evaluating information according to the on state or the off state in each of the user evaluating boxes 73 for each utterance sentence at the completion of the operation of the detection history list 70 (see FIG. 8). At this time, the user evaluating information holds columns that are not the evaluated object as "–".

Then, the controller 20 deletes the popup display of the detection history list 70 (S26), and ends the processing according to the flowchart. The processing order of steps S25 and S26 is not particularly limited.

According to the above processing, the controller 20 causes the display 23 to display the detection history list 70 including the utterance sentences in the history data D1 according to the likelihood regarding the topic C designated by the user 4 (S22). In the detection history list 70, the user 4 can evaluate whether or not the detection result of the utterance sentences regarding the specified topic C is appropriate.

3. Summary

As described above, in the present embodiment, the description support device 2 displays the information on the topics C1 to C10 to be checked in the utterance of the user 4. The description support device 2 includes the microphone 26, which is an example of the inputter, the controller 20, and the display 23. The microphone 26 acquires audio data as input information indicating an utterance sentence by utterance (S1). The controller 20 generates information indicating the check result of the topics regarding the utterance sentence (S4). The display 23 displays the information generated by the controller 20 (S14, S18, and S22). The display 23 displays the checklist indicating whether or not the topics C1 to C10 are described in the utterance sentence indicated by the input information sequentially acquired by the microphone 26. The display 23 displays the utterance list 55 or the detection history list 70 as display information including the utterance sentence according to the likelihood of each utterance sentence that defines the check result of the topic C in the checklist 50 (S18 and S22).

According to the description support device 2 described above, the display information including the utterance sentences according to the likelihood is displayed together with the checklist 50 for the topics C to be checked. According to this, it can facilitate to support the user 4 in checking description of the topics C by information processing.

In the present embodiment, the checklist 50 indicates whether or not the topics C are described based on the likelihood of each utterance sentence. The user 4 can see that the check result of the checklist 50 has been obtained based on the likelihood in the display information, and it can facilitate to provide information support to the user 4.

In the present embodiment, the display 23 updates the utterance list 55 (S18) each time the input information is acquired from the microphone 26 (S1). This allows the user 4 to see the detection result of the system 1 in real time, such as in conversation.

In the present embodiment, the utterance list 55 as the display information includes the utterance sentence column 57 indicating an utterance sentence, and the remarks column 58 indicating the magnitude of the likelihood of the utterance sentence. The user 4 can see the detection result in a manner of comparing the utterance sentence and the likelihood in the utterance list 55.

In the present embodiment, the description support device 2 further includes the memory 21 to record the history data D1 in which the utterance sentences and the likelihoods are associated with each other. The controller generates the detection history list 70 as display information based on the history data D1 recorded in the memory 21 (S22). This allows the user 4 to see the detection result of the system 1 thereafter. The detection history list 70 may include the playback bars 71 for playing audio data for the selected topic C, and a display of utterance sentences for the selected topic C.

In the present embodiment, the detection history list 70 includes the system detecting boxes 72 that each indicate whether or not the associated likelihood is greater than the predetermined detection threshold V1 for each utterance sentence in the history data D1. The system detecting boxes 72 allow the user 4 to easily see the detection result of the system 1 in the detection history list 70.

In the present embodiment, the operation receiver 22 is further provided for inputting a user operation of evaluating the check result of the topic C in the user evaluating box 73 for each utterance sentence in the detection history list 70. As a result, information indicating the evaluation of the user 4 with respect to the detection result of the system 1 can be obtained, and the system 1 can be easily operated.

In the present embodiment, the inputter of the description support device 2 includes the microphone 26 that acquires audio data as input information. The utterance sentence indicates a voice recognition result of audio data. The detection operation of the system 1 can be performed according to the sound uttered by the user 4.

The description support method in the present embodiment is a method of displaying information on the topics C1 to C10 to be checked in the utterance of the user 4. The method includes step S1 of acquiring, by the inputter, input information indicating the utterance sentence by the utterance, step S4 of generating, by the controller 20, information indicating the check result of the topics for the utterance sentence, and steps S14, S18, and S22 of displaying, by the display 23, information generated by the controller 20. The display 23 displays the checklist 50 indicating whether or not the topics C1 to C10 are described in the utterance sentence indicated by the input information sequentially acquired by the inputter. The display 23 displays display information including the utterance sentence according to the likelihood of each utterance sentence that defines the check result of the topic C in the checklist 50.

In the present embodiment, a program for causing the controller 20 of the computer to execute the above-described description support method is provided as well as a non-transitory computer-readable recording medium storing the program. According to the description support method of the present embodiment, it is easy to support the user 4 in checking description of the topics C by information processing.

Second Embodiment

Hereinafter, a second embodiment will be described with reference to the drawings. In the first embodiment, the description support system 1 detects whether or not the topics have been described in the utterance of the user 4. The second embodiment will describe a description support system 1 that further detects the presence or absence of an NG (no-good) phrase or the like in the utterance of the user 4.

Hereinafter, the description support system 1 and a description support device 2 according to the present embodiment will be described while description of the same configurations and operations as those of the description support system 1 according to the first embodiment are appropriately omitted.

Figure 13:
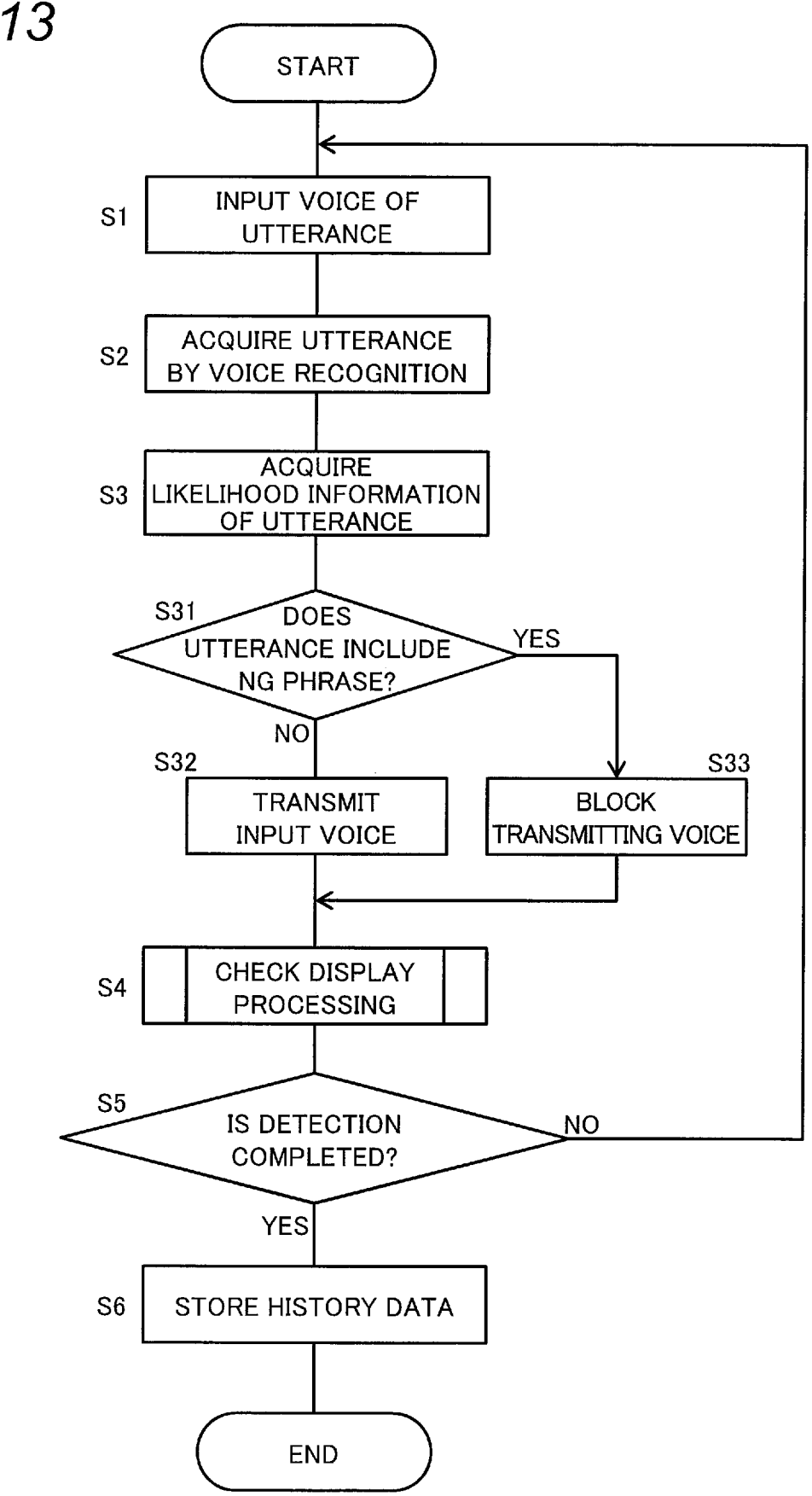
FIG. 13 is a flowchart for explaining a detection operation of the description support system according to a second embodiment.

FIG. 13 is a flowchart for explaining the detection operation of the description support system 1 according to the second embodiment. The description support system 1 according to the present embodiment executes processing for detecting an NG phrase as shown in FIG. 13 in addition to processing similar to that of FIG. 6 (S31 to S33).

The controller 20 of the description support device 2 in the present embodiment detects whether or not the utterance sentence includes a preset NG phrase (i.e. prohibited phrase) based on the utterance sentence or the likelihood information acquired in steps S2 and S3 (S31). The determination in step S31 may be performed by detecting a predetermined NG phrase in the utterance sentence as a keyword, or by using the learned model 35. The learned model is configured by machine learning for outputting the likelihood indicating the degree to which the utterance sentence is predicted to be an NG phrase together with the likelihoods of the various topics C1 to C10.

When the controller 20 detects that the utterance sentence does not include an NG phrase (NO in S31), the description support device 2 transmits audio data corresponding to the utterance sentence to the customer terminal 41 (S32). For example, the controller 20 buffers the audio data acquired in step S1 until the determination in step S31.

On the other hand, when the controller 20 detects that the utterance sentence includes an NG phrase (YES in S31), the network I/F 25 is controlled so as to block the transmission of the audio data from the description support device 2 to the customer terminal 41, for example (S33). As a result, when it is detected that the user 4 utters the NG phrase, it is possible to prevent the customer 40 from recognizing the voice in which the NG phrase is uttered.

Figure 14:
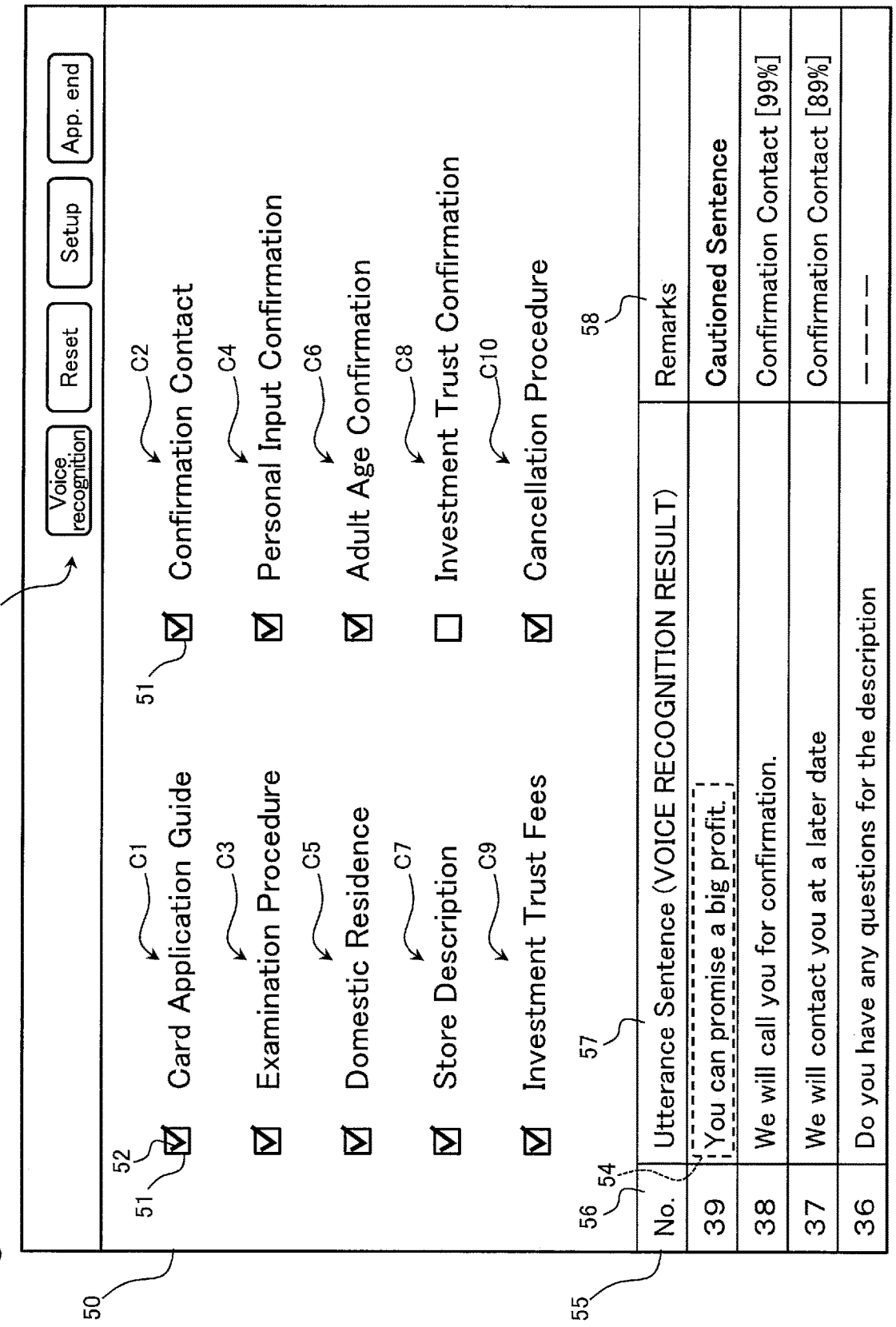
FIG. 14 is a diagram showing a display example in the description support device of the second embodiment.

FIG. 14 shows a display example in the description support device 2 of the present embodiment. When the NG phrase as described above is detected (YES in S31), the description support device 2 may perform displaying caution to the user 4 of the NG phrase in the check display processing (S4). FIG. 14 shows a display example when an utterance sentence 54 "You can promise a big profit" is detected as an NG phrase. In the display example, the display 23 displays a "cautioned sentence" in the remarks column 58 corresponding to the utterance sentence 54. As a result, the user 4 can be alerted when the NG phrase is detected.

As described above, in the present embodiment, the description support device 2 further includes a communication interface such as the network I/F 25 or the device I/F 24 that transmits information indicating the utterance sentence to the outside. When detecting a predetermined prohibited phrase such as an NG phrase in the utterance sentence, the controller 20 controls the communication interface so as to block transmission of information indicating the utterance sentence in which the NG phrase is detected. As a result, the information indicating the NG phrase can be selectively suppressed from being transmitted to the outside, and information support can be provided to the user 4.

OTHER EMBODIMENTS

As described above, the first and second embodiments have been described as an example of the technology disclosed in the present application. However, the technology in the present disclosure is not limited to this, and is applicable to embodiments in which changes, replacements, additions, omissions, and the like are appropriately made. Further, each component described in each of the above embodiments can be combined to make a new embodiment. Therefore, other embodiments are described below.

In each of the above embodiments, the description support device 2 of the description support system 1 performs voice data communication with the customer terminal 41. The description support device 2 of the present embodiment is not limited to voice data communication, and may perform various data communications.

In each of the above embodiments, the description support device 2 of the description support system 1 communicates data with the customer terminal 41. However, the description support device 2 of the present embodiment may not particularly communicate data with the customer terminal 41. The system 1 may be applied to various types of face-to-face services, such as a window of a financial institution. In this case, the description support device 2 can be configured to appropriately distinguish the utterance of the user 4 from the utterance of the customer 40.

In each of the above embodiments, the audio data of the utterance is illustrated as the input information of the description support device 2. In the present embodiment, the input information of the description support device 2 need not be audio data but may be text data. The system 1 can be applied to various electronic conferences, for example.

As described above, the embodiments have been described as an example of the technology in the present disclosure. To that end, the accompanying drawings and detailed description are provided.

Accordingly, some of the components described in the accompanying drawings and the detailed description may include not only essential components for solving the problem but also components which are not essential for solving the problem in order to describe the above technology. Therefore, the fact that those non-essential components are described in the attached drawings and the detailed description should not immediately mean that those non-essential components are essential.

Further, the above-described embodiments are provided to illustrate the technology in the present disclosure, and hence it is possible to make various changes, replacements, additions, omissions, and the like within the scope of claims or the equivalent thereof.

INDUSTRIAL APPLICABILITY

The present disclosure can be applied to information support when a user gives various descriptions, and can be applied to e.g., a call center, a remote customer service system, or various face-to-face services.

The invention claimed is:

1. A description support device for displaying information on a topic to be checked in an utterance by a user, the description support device comprising:

an inputter to sequentially acquire input information from the user, wherein the input information includes a plurality of utterance sentences;

a controller to receive a check result of the topic for each utterance sentence in the input information from a language processor;

a display to display the check result received by the controller;

a communication interface to communicate data with the language processor provided externally from the description support device; and a memory to store a checklist indicating the topic to be checked, wherein the controller is configured to cause the display to display the check result, based on the checklist stored in the memory, the check result indicating whether or not the topic in the checklist is described in each utterance sentence and a corresponding likelihood of the utterance sentence, wherein the controller is configured to cause the communication interface to: automatically transmit the input information to the language processor in response to acquiring the input information from the inputter; and automatically receive the check result from the language processor in response to calculating the likelihood by the language processor, wherein the likelihood of each utterance sentence includes the likelihood indicating a degree to which each utterance sentence is predicted to be a keyword together with the likelihood of the topic in the checklist is detected in the corresponding utterance sentence, wherein the language processor is configured to calculate the likelihood of each utterance sentence by executing word embedding to convert each utterance sentence into a vector, input the vector into a learned model to search keyword and to check whether the topic in the checklist is detected in each utterance sentence and output the likelihood of each utterance sentence, wherein the controller is configured to cause the display to display, according to the likelihood of each utterance sentence, the check result as display information.

2. The description support device according to claim 1, wherein the check result indicates whether or not the topic is described based on the likelihood of each utterance sentence.

3. The description support device according to claim 1, wherein the display is configured to update the display information each time the input information is acquired from the inputter.

4. The description support device according to claim 1, wherein the display information includes the utterance sentence and information indicating a magnitude of the likelihood of the utterance sentence.

5. The description support device according to claim 1, wherein the memory is configured to record history data in which the utterance sentence and the likelihood are associated with each other, wherein the controller is configured to generate the display information based on the history data recorded in the memory.

6. The description support device according to claim 5, wherein the display information includes, for each utterance sentence in the history data, information indicating whether or not the associated likelihood is greater than a predetermined threshold value.

7. The description support device according to claim 5, wherein the display information includes a playback bar for playing audio data of a selected topic, and an indicator of an utterance sentence for the selected topic.

8. The description support device according to claim 1, further comprising an operation receiver to input a user operation of evaluating the check result of the topic for each utterance sentence in the display information.

9. The description support device according to claim 1, wherein the communication interface is configured to transmit information indicating the utterance sentence to an external device, wherein, in response to detecting a predetermined prohibited phrase in the utterance sentence, the controller is configured to control the communication interface to block transmission of the information indicating the utterance sentence in which the prohibited phrase is detected.

10. The description support device according to claim 1, wherein the inputter includes a microphone to acquire audio data as the input information, and wherein the utterance sentence indicates a voice recognition result of the audio data.

11. The description support device according to claim 1, wherein the controller is configured to update the displayed check result in real-time to indicate whether or not the topic is described, based on the likelihood of each utterance sentence dynamically received by the communication interface from the language processor.

12. The description support device according to claim 1, wherein the checklist includes a plurality of topics, and the learned model has an output layer including a plurality of nodes corresponding to the plurality of topics to output the likelihood for each of the topics.

13. The description support device according to claim 1, wherein the memory is configured to record history data in which the utterance sentence and the likelihood for the topic are associated with each other, wherein in response to a user input specifying the topic in the display information displayed on the display, the controller is configured to cause the display to display a popup indicating a history for the specified topic, based on the history data recorded in the memory.

14. A description support system comprising:

the description support device according to claim 1; and the language processor having the learned model, wherein the language processor is configured to calculate the likelihood of each utterance sentence by executing word embedding to convert each utterance sentence into the vector, input the vector into the learned model to search keyword and to check whether the topic in the checklist is detected in each utterance sentence and output the likelihood of each utterance sentence.

15. A description support method of displaying information on a topic to be checked in an utterance by a user, the description support method comprising:

sequentially acquiring, by an inputter, input information from the user, wherein the input information includes a plurality of utterance sentences;

receiving, by a controller, a check result of the topic for each utterance sentence in the input information from a language processor; and causing, by the controller, a display to display the check result, based on a checklist indicating the topic to be checked, the checklist being stored in a memory, the check result indicating whether or not the topic in the checklist is described in each utterance sentence and a corresponding likelihood of the utterance sentence, wherein the language processor calculates the likelihood of each utterance sentence by executing word embedding to convert each utterance sentence into a vector, input the vector into a learned model to search keyword and to check whether the topic in the checklist is detected in each utterance sentence and output the likelihood of each utterance sentence, wherein the likelihood of each utterance sentence includes the likelihood indicating a degree to which each utterance sentence is predicted to be a keyword together with the likelihood of the topic in the checklist is detected in the corresponding utterance sentence, and the controller causes the display to display, according to the likelihood of each utterance sentence, the check result.

16. A non-transitory computer-readable recording medium storing a program for causing a computer to execute the method according to claim 15.

17. A description support system for displaying information on a topic to be checked in an utterance by a user, the description support system comprising:

an inputter to sequentially acquire input information from the user, wherein the input information includes a plurality of utterance sentences;

a controller to receive a check result of the topic for each utterance sentence in the input information from a language processor;

a display to display the check result received by the controller; and a language processor having a learned model, wherein the controller is configured to cause the display to display the check result indicating whether or not the topic in a checklist is described in each utterance sentence and a corresponding likelihood of the utterance sentence, wherein the likelihood of each utterance sentence includes the likelihood indicating a degree to which each utterance sentence is predicted to be a keyword together with the likelihood of the topic in the checklist is detected in the corresponding utterance sentence, wherein the language processor is configured to calculate the likelihood of each utterance sentence by executing word embedding to convert each utterance sentence into a vector, input the vector into the learned model to search keyword and to check whether the topic in the checklist is detected in each utterance sentence and output the likelihood of each utterance sentence, and wherein the controller is configured to cause the display to display, according to the likelihood of each utterance sentence, the check result.

* * * * *